United States Patent [19]
Crossman et al.

[11] 3,907,076
[45] Sept. 23, 1975

[54] KEY SLOT SEGMENTS FOR DRIVING BRAKE DISCS

[75] Inventors: Richard L. Crossman; Albert W. Cook, both of Tallmadge, Ohio; Jesse G. Hawley, Penn Yan, N.Y.

[73] Assignee: Goodyear Aerospace Corporation, Akron, Ohio

[22] Filed: Sept. 10, 1973

[21] Appl. No.: 395,530

Related U.S. Application Data

[62] Division of Ser. No. 146,181, May 24, 1971, Pat. No. 3,757,907.

[52] U.S. Cl. ................... 188/218 XL; 192/107 R
[51] Int. Cl.² .................................... F16D 65/12
[58] Field of Search ........ 188/73.2, 218 XL, 251 A; 192/107 R, 70.14

[56] References Cited
UNITED STATES PATENTS

| | | | |
|---|---|---|---|
| 2,542,545 | 2/1951 | Lyman | 188/218 XL |
| 2,902,130 | 9/1959 | Halberg et al. | 188/218 XL |
| 3,550,740 | 12/1970 | Le Blanc | 188/218 XL X |
| 3,605,967 | 9/1971 | Warren et al. | 188/73.2 X |
| 3,618,729 | 11/1971 | Ely et al. | 188/218 XL X |
| 3,650,357 | 3/1972 | Nelson et al. | 188/73.2 X |
| 3,698,519 | 10/1972 | Crossman | 192/107 R X |
| 3,708,042 | 1/1973 | Krause et al. | 188/73.2 |
| 3,757,907 | 9/1973 | Crossman et al. | 188/218 XL |

*Primary Examiner*—George E. A. Halvosa
*Attorney, Agent, or Firm*—F. H. Brunner; P. E. Milliken; E. W. Oldham

[57] ABSTRACT

Annular brake discs are provided with metal key slot segments. The metal segments are fastened such as by rivets to the discs and the location of the fasteners are positioned to evenly distribute torque load through the metal segments to the discs. The discs may be either of single piece, multiple piece, or segmented construction. In the segmented construction the metal keyway segments also serve as links connecting the disc segments together. The method for mounting the segments to the discs is also covered.

3 Claims, 22 Drawing Figures

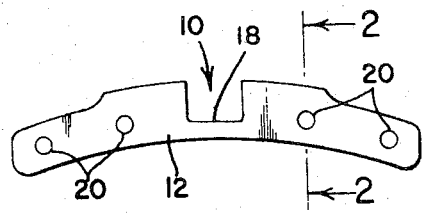
FIG. 1
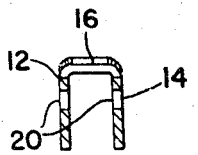
FIG. 2
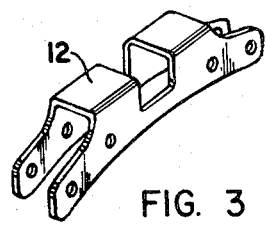
FIG. 3
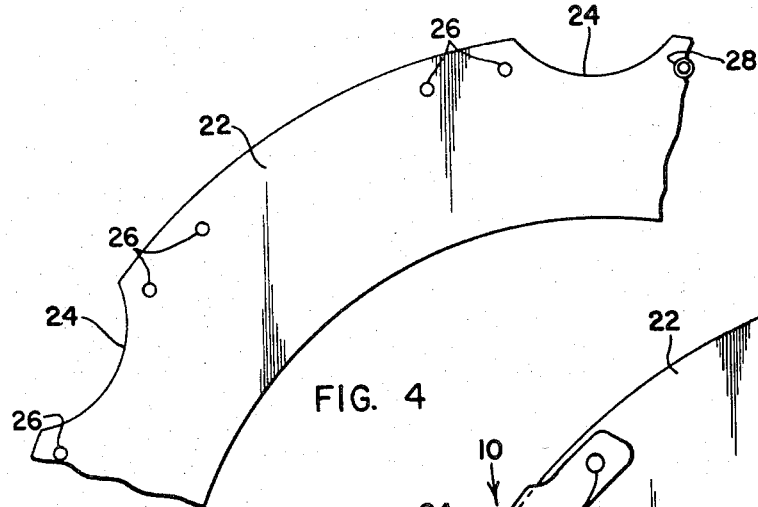
FIG. 4
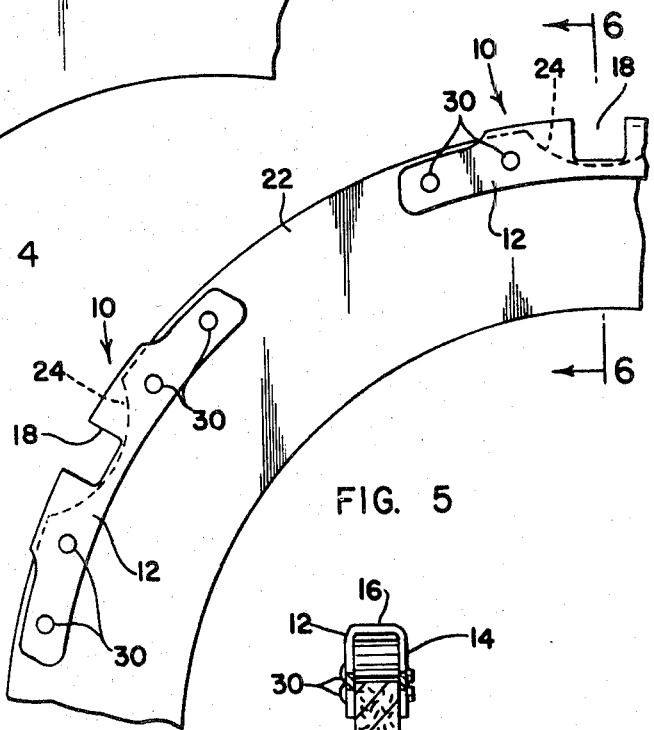
FIG. 5
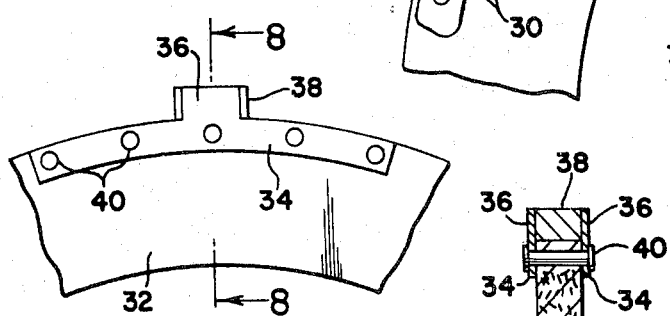
FIG. 6
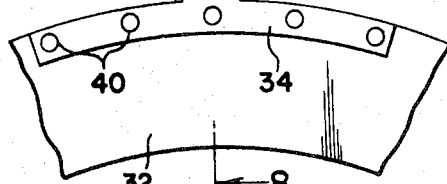
FIG. 7
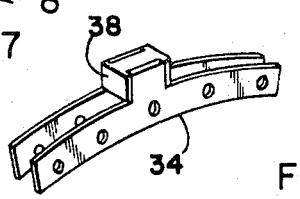
FIG. 8
FIG. 9

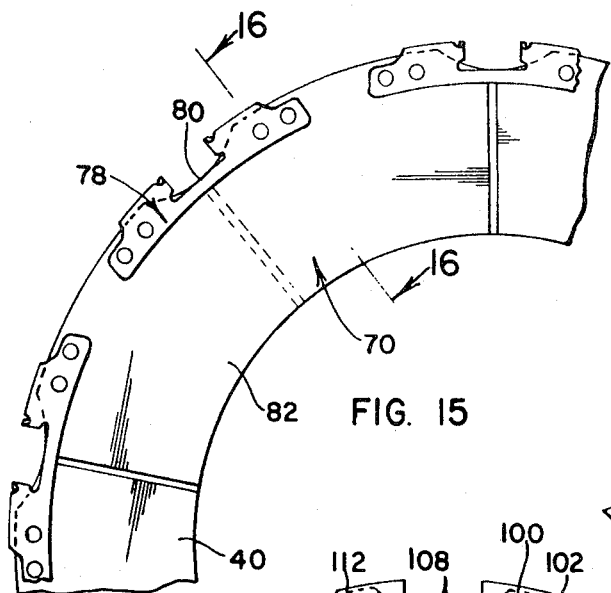
FIG. 15
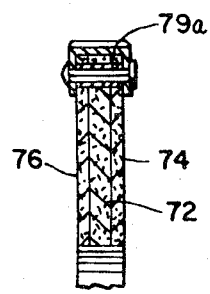
FIG. 16
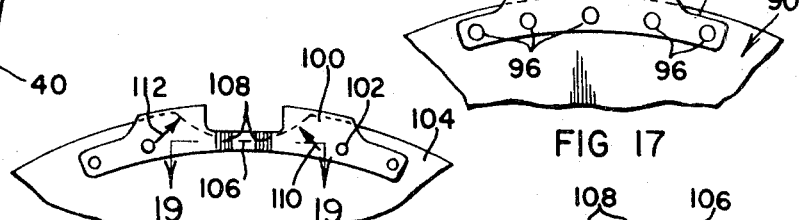
FIG 17
FIG. 18
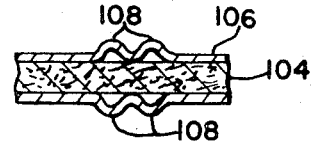
FIG. 19
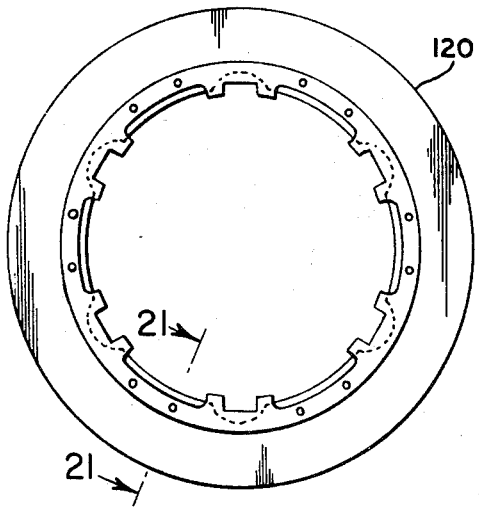
FIG. 20
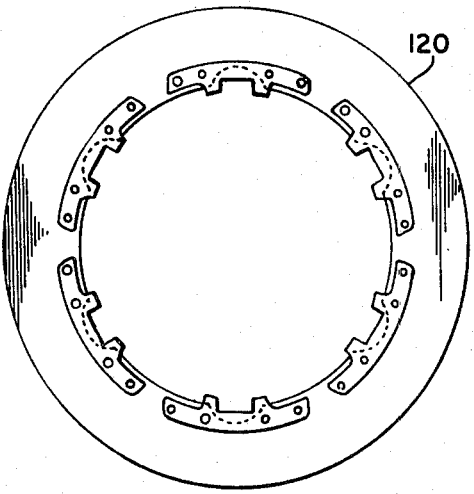
FIG. 22
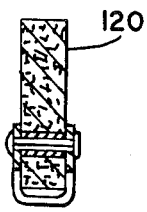
FIG. 21

KEY SLOT SEGMENTS FOR DRIVING BRAKE DISCS

This is a division, of application Ser. No. 146,181, filed May 24, 1971, now U.S. Pat. No. 3,757,907.

In brake disc assemblies which have low weight, high heat sink discs and metal key slot segments to provide drive slots or to join the segments together, the unequal thermal expansion of the metal and disc assemblies may result in severe stressing at certain of the fastening points between the metal and disc assemblies. This stressing may be sufficient to produce failure of the disc assembly. Also, where a number of fasteners such as rivets are used to secure each of the metal segments, unequal stress distribution at the different fasteners may occur. As a result, the disc material immediately adjacent the more highly stressed fasteners may fail prematurely.

The invention eliminates high bearing stress in a carbon based or somewhat brittle brake material itself by distributing bearing load into rivets which effectively increases the material bearing area by 100%.

The invention also allows a generous half moon shape contour in the material thereby eliminating sharp notch corners and stress concentration points.

The invention establishes a critical relationship between rivet hole sizes in the brake material, rivet bushing diameter, and number of rivets needed to properly distribute bearing load into disc structure thereby accounting for thermal expansion as well as mechanical stress distribution.

It is the primary object of the invention to provide a lightweight carbon brake disc which can withstand high torque loading by using a metallic key slot segment at the drive keys or lugs with many fasteners attaching the segment to the disc to evenly distribute torque loading to a large area of the carbon brake disc and to also substantially reduce stress concentrations.

It is a further object of the present invention to provide a carbon brake disc assembly which has metal segments to distribute torque and reduce stress concentrations and in which the fasteners securing the metal and carbon elements together are constructed so as to compensate for differential heat expansion of the elements and to assure uniform loading at all of the fastening points.

It is also an object of the present invention to provide a mounting arrangement for metal key slot segments on carbon brake discs which distributes the bearing load among the fasteners to effectively increase the bearing area of the carbon material.

The above and other objects of the invention which will become apparent as set forth in the following description are achieved by utilizing metallic key slot segments shaped cooperatively with a carbon based brake disc so as to provide drive slots or lugs to transfer torque to the disc to a large portion thereof, and where the disc is formed to cooperate with the segments so that stress distribution is substantially improved.

For a more complete understanding of the invention and the objects and advantages thereof, reference should be had to the following detailed description and the accompanying drawings wherein there is shown a preferred embodiment of the invention. In the drawing:

FIG. 1 is a side elevational view of a metal keyway clip employed on the discs of the present invention;

FIG. 2 is a transverse sectional view taken along the line 2—2 of FIG. 1;

FIG. 3 is a perspective view of the clip of FIG. 2;

FIG. 4 is a fragmentary side elevational view of the annular carbon disc portion of the brake disc assembly;

FIG. 5 is a fragmentary side elevational view of the complete brake disc assembly;

FIG. 6 is a fragmentary sectional view taken along the line 6—6 of FIG. 5;

FIG. 7 is a fragmentary side elevational view of a second embodiment of the invention;

FIG. 8 is a fragmentary sectional view taken along the line 8—8 of FIG. 7;

FIG. 9 is a perspective view of the clip of FIGS. 7 and 8;

FIG. 15 is a broken away front elevational view of a modified rotating disc assembly utilizing a carbon wear pad configuration;

FIG. 16 is a cross-sectional view of the assembly of FIG. 15 taken on line 16—16 thereof;

FIG. 17 is a broken away side elevational view of a modified brake disc showing a modified key slot segment;

FIG. 18 is a broken away side view of a modified embodiment of the invention;

FIG. 19 is a cross-sectional view of the embodiment of FIG. 18 taken on line 19—19 thereof;

FIG. 20 is a side view of another modified embodiment of the invention;

FIG. 21 is a cross-sectional view of the assembly of FIG. 20 taken on line 21—21 thereof; and FIG. 22 is a side view of another modified embodiment of the invention.

Figure 10:
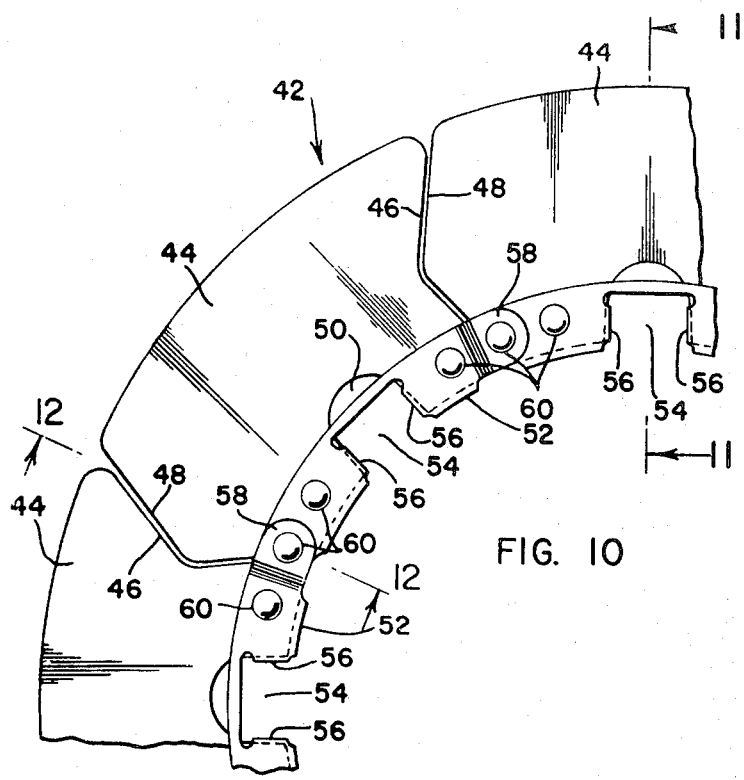
FIG. 10 is a fragmentary side elevational view of a third embodiment of the invention.

The key slot segment of FIGS. 1–3, designated generally by the reference numeral 10, is formed of a suitable metal such as sheet steel. The segment 10 has substantially parallel side portions 12 and 14 which are spaced apart by the thickness of the carbon disc element and are joined by intermediate portions 16 as seen in FIG. 2. Aligned notches 18 are provided in each of the side portions 12 and 14 and intermediate portion 16 for engaging the drive splines of a wheel. One of the side portions 12 is provided with holes 20. It should be noted that these holes may be of a smaller diameter than the rivets which are employed to secure the key slot segments to the carbon discs. In this embodiment illustrated, the holes 20 are of a diameter of 0.125 inches and are spaced apart by approximately 0.56 inches. As will become apparent below, these holes serve to locate and center the holes which receive the rivets and compensate for thermal expansion or contraction of the discs.

FIG. 4 illustrates an annular carbon disc 22 which is provided with uniformly curved notches 24 at spaced intervals on its outer circumference. In the embodiment illustrated the disc 22 is provided with six notches 24, the notches being located at 60° intervals on the outer circumference of the disc. In the embodiment illustrated the notches 24 are cut on a 1.87 inch radius with the base of each notch spaced 6.687 + 0.010 − 0.000 from the center of the disc. The disc inner diameter is 9.25 + 0.06 − 0.03, while the outer diameter is 14.375 ± 0.010. The base of each notch is determined so that the key or driving leg cooperating with each respective segment will clear the curved base of the respective notch.

The disc is preferably made from a carbon base material. The carbon base may be carbon itself, particularly in the form of graphite or amorphous carbon, or carbon compounds typical of which are the carbides such as boron carbide, silicon carbide and titanium carbide. Mixtures of carbon in its various forms may of course be used. In addition to the carbon base, other ingredients may be used such as anti-oxidants, binders, fillers, strengthening agents and reinforcing fibers or cloth laminates. However, it should be understood that the principles of the invention are applicable to any brake material, or brake disc, and are not limited to this type of carbon base material.

FIGS. 5 and 6 show an assembled brake disc. A segment 10 is positioned at each of the curved notches 24 of the carbon disc 22 with the notches 18 of the segments being centered within the notches 24 of the disc 22. The holes 20 on the faces 12 and 14 of the segments are aligned with appropriate holes 26 which are drilled through the carbon disc 22. These holes 20 and 26 are accurately aligned with one another. In the illustrated embodiment the holes 20 and 26 are of a diameter slightly larger than the rivets 30 which are employed to secure the segments 10 to the carbon disc 22. The diameter difference is between 0.0005 to 0.005 inches, and preferably about 0.001 inches. It should also be noted that in the preferred embodiment the distance between the adjacent pairs of holes 20 and 26 is not greater than one inch. These distances and hole diameters are carefully chosen to insure that torque transfer will be effectively accomplished by placing equal loading on all sections of the disc.

It is contemplated by the invention that bushings 28 one of which is illustrated in FIG. 4 may be provided in the holes 26 through the carbon discs. In such an event, again to provide temperature compensation for the different expansion characteristics of the disc and metallic bushings or rivets, the holes through the bushings 28 are of a diameter slightly greater diameter than the rivets. For example, the holes in the carbon discs 22 may be of 0.257 − 0.258 inch diameter and the sleeves or bushings of an external diameter of 0.247 − 0.248 inch diameter and an internal diameter of 0.189 inches.

In either of the embodiments described, the diameters of the holes in the segments 10 and those in the carbon discs 12, as well as the diameter of the sleeves or bushings, are sufficient to compensate for uneven thermal expansion between the carbon discs 12 and the metal segments 10. With the correct alignment of the holes, a uniform mechanical loading at each of the fasteners can be achieved.

It is a feature of the invention that the position of the rivets nearest the notch 18 of each segment be carefully determined to insure good torque transfer characteristics through the segment and its attachment rivets. To this end the holes nearest the notches are approximately equidistant from the notch to the hole as from the disc circumference to the hole. Further to this end the cut away portions at each end of the segment being at an angle of 15° from the center of the hole away from the notch measured beginning at a radius line through the hole.

It should be apparent that the use of different diameter fasteners and/or variation in the spacing between adjacent fasteners would require different numerical clearance values from those given above. However, the clearance values in such situations can readily be determined. One feature of the invention resides in providing sufficient clearance to allow for the different heat expansion of the metal and carbon elements and the assurance of the proper alignment of each of the holes to achieve uniform stress loading at all of the fastening points.

As is shown in FIGS. 7, 8, and 9, the principles of the present invention may be used with segments or fasteners other than those shown in FIGS. 1 through 6. In FIGS. 7, 8, and 9 there is illustrated an annular carbon disc 32 which has circular inner and outer circumferences. Metallic plates, preferably steel, 34 are provided at spaced intervals on the outer circumference of the disc 32, with mating pairs of plates being provided on opposite sides of the disc. Each of the plates 34 has an outwardly projecting portion 36 and a metallic insert 38, again preferably steel, is brazed or otherwise appropriately secured between these projecting portions 36. Rivets 40 are employed to secure the plates 34 to the opposite faces of the carbon disc 32. The steel inserts 38 serve to engage drive grooves or splines on the wheel assembly (not shown).

Figure 11:
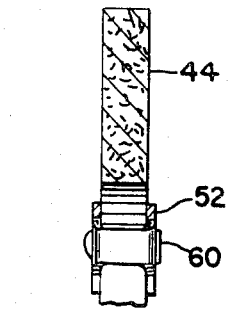
FIG. 11 is a fragmentary sectional view taken along the line 11—11 of FIG. 10.
Figure 12:
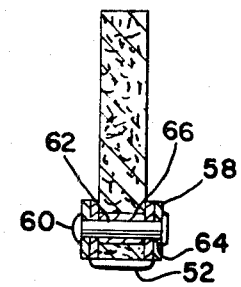
FIG. 12 is a fragmentary sectional view taken along line 12—12 of FIG. 10.

FIGS. 10, 11 and 12 illustrate the application of the principles of the present invention to an articulated brake disc. The articulated disc 42 is comprised of a number of carbon segments 44 which may have mating, interlocking ends 46 and 48 and are arranged to form an annular disc. The disc 42 is a stationary disc and is provided with notches 50 at uniformly spaced intervals on its inner circumference, one notch 50 being provided in each of the segments 44. Metal key slot segments 52 which have notches 54 in their side portions are mounted on the inner circumference of the disc 42 with the notches 54 of the slot segments aligned with the notches 50 of the disc segments. The side portions at one end of each of the segments 52 are offset, as indicated by the numeral 58, so as to overlap the opposite end portions of the adjacent segment. Rivets 60 serve to secure the segments 52 to the disc segments 44 and to one another. Bushings 62 are provided in the carbon segments 44 to receive the rivets 60. The spacing between adjacent rivets 60, the tolerances between the holes 64 in the segments 52 and the rivets 60, the tolerances between the rivets 60 and bushings 62, as well as the tolerances between the bushings 62 and the holes in the carbon segments 44 are maintained within the limits specified above to compensate for unequal thermal expansion of the metal and carbon components of the disc assembly and to assure uniform loading at all fastening points.

While, FIGS. 10, 11 and 12 illustrate the articulated design for a stationary disc with the keyway segments on the internal circumference, it should be understood that this could apply to a rotating disc with keyway segments on the outer circumference as well.

It is also contemplated that the torque transmitting sides 56 of the notches 54 may be machined to their final dimensions after the links 52 have been riveted to the segments 44. By so doing, the sides 56 may be precisely located, further assuring uniform stress loading of the disc assembly.

Figure 13:
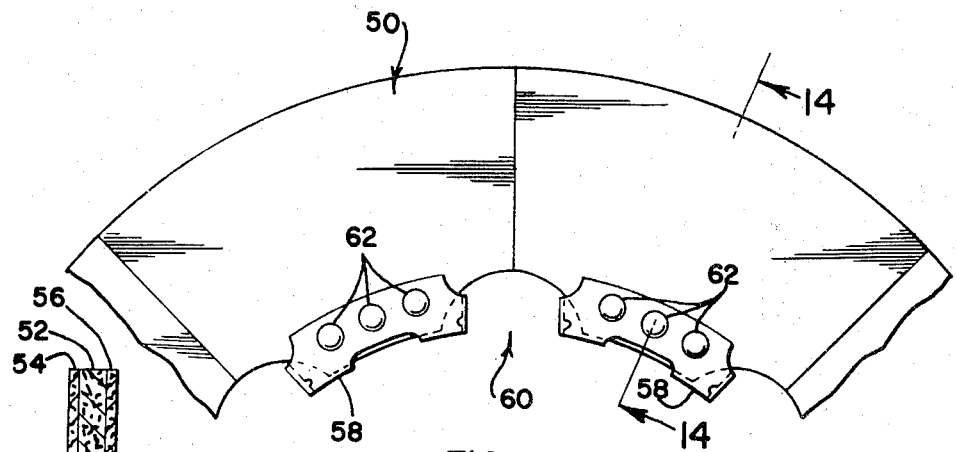
FIG. 13 is a broken away front elevational view of a modified stationary brake disc assembly utilizing a carbon wear pad configuration.
Figure 14:
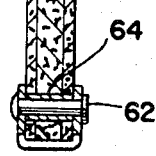
FIG. 14 is a cross-sectional view of the assembly of FIG. 13 taken on line 14—14 thereof.

FIGS. 13 and 14 illustrate a modified embodiment of the invention where the disc, indicated generally by numeral 50, comprises, as best seen in FIG. 14, a central carbon base core 52 and carbon base wear pads or segments 54 and 56 on both sides thereof. Preferably, the core 52 is made from a carbon base material having higher structural strength, and is of about twice the thickness of the carbon base wear pads or segments 54 and 56. Also, the core is preferably a full annular disc, although it could be segmented. Preferably, the wear pad segments 54 and 56 are short arcs, as is clearly seen in FIG. 13 although they also may be full circle.

In the embodiment of FIGS. 13 and 14, the key slot segments, indicated generally by numeral 28, again are stamped from a suitable metal, preferably steel, and formed to the configuration illustrated. In this embodiment, each pair of adjacent segments 58 cooperates to define the keyway driving slots 60 between the adjacent ends thereof. Three rivets 62 are utilized with appropriate bushings 64 to hold each one of the segments 58 in appropriate position and assure equal torque transfer characteristics to the base core 52 of the disc 50, all as more fully defined above with reference to the other embodiments.

It is important in this embodiment of the invention, however, that each segment 58 actually extend between two adjacent notches 60 so that each end of the segment actually defines one side of each of the adjacent driving notches 60, rather than defining the full drive notch as in the above-defined embodiments of the invention. However, the fact that the segment 58 does extend between adjacent drive notches, means that it does provide enough supporting surface with the rivets 62 that equal torque transfer is accomplished for the entire disc 50, and because of the curved shaped configuration of the notches 60 in the carbon base disc, no points of undue strain are present in this construction, and it works quite effectively.

It should be pointed out, however, that this construction appears to be most feasible for the radially inner notches, or those notches normally configured with the stationary brake element that engage appropriate splines on the fixed hub. Obviously, on the internal circumference of brake discs of this type, the distance between notches 60 is much less than on the external circumference, and hence these shorted elements 58 will suffice as still covering approximately the same number of degrees of arc as the longer segments on the external circumference.

FIGS. 20 and 21 illustrate a full circle segment 120 which might be used in some cases, perhaps particularly on a smaller disc, or in a situation where greater strength is needed, or where weight is not such a critical factor. The full circle segment could be on either the inner or outer circumference.

FIG. 22 illustrates short arcuate segments each defining a notch on the inner circumference of a brake disc 120.

FIGS. 15 and 16 illustrate another modified embodiment of the invention. In this embodiment, the brake disc is illustrated generally by numeral 70 and comprises a central core 72 made from a carbon base material and carbon base wear pads 74 and 76, respectively, similar to the embodiment of FIGS. 13 and 14. Again, the base core 72 is preferably a full circle annular member, although it could be segmented and held together by the key slot segments indicated generally by numeral 78. The segments 78 are similar to those illustrated in the embodiments above, as are the semi-circular notches 80 cut in the periphery of the disc 70. In this embodiment, the wear pads or plates 74 and 76 are definitely contemplated as arcuate sections and as illustrated in FIG. 15 they may be of any arc deemed compatible with the base core 72, and show for example sections 82 and 84 which are in arc length.

In order to give the most strength to the total disc 70, the pads 74 and 76 are preferably alternately arranged so that the end of each pad 74 falls at about the midpoint of the opposite pad 76. This is clearly illustrated in FIG. 15 by the dotted lines on the disc 70. Similarly if the core 72 were segmented the ends of each of the sections of core would be staggered so that the ends of the sections would never be aligned.

The segments 78 are riveted in position with appropriate rivets 79 and rivet liners 79a as seen in FIG. 13 in the same manner as the embodiments of FIGS. 1 through 6 described above. As pointed out with reference to the embodiments of FIGS. 13 and 14, the drive slots 80 are fully defined by the segments 78 rather than extending between adjacent slots or notches 80, as the most efficient torque transfer and uniform loading of the disc 70 is achieved in this manner.

It should be clearly understood that the general and basic purpose of the invention is to provide reinforcement to a carbon based disc for a disc brake construction so that torque requirements are uniformly transferred throughout the disc, potential areas of structural failure are thereby eliminated, and the use of a lightweight, high heat sink friction material such as carbon can be utilized in a disc brake construction. Thus, it should be understood that in the embodiments described above, the semi-circular notching eliminates the stress points where cracking and failure normally occurs. The notching becomes necessary because it is desirous to have the largest rubbed surface possible and the most heat sink in a given radial space. If, however, larger radial areas were possible in a particular disc brake configuration, the embodiment of the invention illustrated in FIG. 17 could be utilized. Here, a carbon based brake disc is illustrated generally by numeral 90, and it could comprise a solid disc, or the segmented disc or the segmented disc with wear pads as defined above. Here, however, the key slot segment indicated generally by numeral 92 is mounted so that the driving notch 94 defined thereby is actually positioned outside the periphery of disc 90 so that no semi-circular notching of the disc 90 is necessary. Suitable rivets 96 hold the segment 92 to the disc 90 in the same manner as the embodiments described above.

As set forth with respect to the embodiments of the invention defined above, the relation of the size of the rivet holes to the size of the rivets is important so that the difference in thermal expansion of the disc material and the metallic clips will not cause failure to the relatively brittle disc material. The embodiment of the invention shown in FIGS. 18 and 19 is designed to accomplish the same purpose without such criticality in the size and relation of the rivets. Here a slot segment is illustrated by numeral 100 and the attachment rivets by numeral 102 and the disc by numeral 104. The segment 100 has a slot spanning section 106 of less radial width than the remainder of the segment and this section is designed to buckle as indicated at 108 upon a differential in thermal expansion and to in effect remain in such slightly buckled configuration during the operation of the disc in a brake assembly. The section 106 may be simply initially made flat, but of such critical dimensional configuration that it will fall or buckle under compressive loading caused by thermal expansion differential. Alternatively, the section 106 could be preformed with the buckled configuration. The segment 100 is still entirely effective to effect torque transfer however, even when buckled because torque transfer puts the section 106 under tension and with torque transfer taking effect in the direction of the arrows 110 and 112 depending upon the direction of rotation of the disc the radially wide portion of section 106 is transferring torque in the plane of the section, but not aligned therewith. Hence, in effect section 106 is not disturbed in the radial direction and complete torque transfer is possible.

Hence, it should be understood that the invention is primarily concerned with providing a structural strengthening member to a lightweight heat sink brake disc element whereby torque transfer to the element can be uniform throughout so that a carbon base material can be utilized for the brake disc element and torque transfer can take place through the element itself. Areas of high stress concentration are relieved at the torque carrying slots by utilizing key slot segments appropriately riveted to the carbon base brake disc itself. The carbon base brake disc can be a full circle solid disc, can be articulated, or it can utilize a wear pad configuration. The same key slot segment can be used on the outer periphery as on the inner periphery, although because of the actual physical difference in length, the inner periphery segment can extend from one notch to the adjacent notch, rather than being the full covering segment utilized on the outer periphery notch. Further, while only notches have been indicated, it is quite obvious that these segments can carry keys to engage appropriate keyways in either the rotating or stationary portion of the wheel in the normal disc brake configuration.

It should also be noted that while specific embodiments of the invention have been illustrated with reference to rotating discs and others with reference to stationary discs, the principles illustrated in each embodiment are applicable to either rotating or stationary discs.

While only the best known embodiments of the invention have been described in detail, it will be understood that the invention is not so limited. Reference should therefore be had to the appended claims in determining the true scope of the invention.

What is claimed is:

1. A brake disk assembly comprising:

a disk body defining an articulated, segmented, substantially annular configuration and made from a carbon based material;

a plurality of curved notches formed in at least one peripheral edge of the body and equally spaced around substantially the full circumference thereof, each notch being intermediate the ends of a disk segment;

a separate unitary one-piece metal drive slot segment operatively substantially non-engagingly associated with each curved notch of the disk body, each drive slot segment defining a torque driving surface positioned within said associated notch for engaging drive splines of a brake assembly on which the disk is installed; all of said drive slot segments being of uniform shape;

means securing each drive slot segment to the body for torque transfer therebetween in such a relationship as to allow for a difference in the thermal expansion characteristics between the body and each respective drive slot segment;

each respective drive slot segment being offset at one end and overlapping the opposite end portion of the adjacent drive slot segment, and said means securing each drive slot segment to the body likewise securing the overlapped end portions of adjacent drive slot segments together.

2. A brake disk assembly according to claim 1 wherein the metallic drive slot segments are U-shaped members having parallel side portions adapted to be positioned on opposite sides of the annular disk, and where the portions defining the bottom of the U cover the circumferential portion of the disk, and with the side portions defining aligned notches for engaging the drive splines for the brake disk assembly.

3. A brake disk assembly according to claim 2 wherein at least two holes are provided in the side portions on each side of the aligned notches defined by the sides, and with one of the holes being substantially centrally positioned in the offset end of each drive slot segment, and aligning with the holes in the other end of the adjacent drive slot segment, and wherein the means securing each drive slot segment are rivets and where one of the rivets for each drive slot segment secures the drive slot segments to each other through such aligned holes.

* * * * *

UNITED STATES PATENT OFFICE
CERTIFICATE OF CORRECTION

PATENT NO. : 3,907,076
DATED : September 23, 1975
INVENTOR(S) : Richard L Crossman, Albert W Cook, Jesse G Hawley It is certified that error appears in the above—identified patent and that said Letters Patent are hereby corrected as shown below:

Column 3, last line, "being" should read -- begin --.

Signed and Sealed this twenty-third Day of December 1975

[SEAL]

Attest:

RUTH C. MASON
Attesting Officer

C. MARSHALL DANN
Commissioner of Patents and Trademarks